US 9,075,144 B1
United States Patent
Straub et al.

Date of Patent: Jul. 7, 2015

(54) DIGITAL RADAR ALTIMETER

(71) Applicant: Garmin International, Inc., Olathe, KS (US)

(72) Inventors: Edward M. Straub, Olathe, KS (US); John C. Johnson, Olathe, KS (US); Heather M. Werling, Overland Park, KS (US)

(73) Assignee: Garmin International, Inc., Olathe, KS (US)

( * ) Notice: Subject to any disclaimer, the term of this patent is extended or adjusted under 35 U.S.C. 154(b) by 302 days.

(21) Appl. No.: 13/660,504

(22) Filed: Oct. 25, 2012

(51) Int. Cl.
G01S 13/08 (2006.01)
G01S 13/88 (2006.01)
G01S 13/34 (2006.01)

(52) U.S. Cl.
CPC .............. *G01S 13/882* (2013.01); *G01S 13/34* (2013.01)

(58) Field of Classification Search
CPC ................................ G01S 13/882; G01S 13/34
USPC .................................................. 342/120, 122
See application file for complete search history.

(56) References Cited

U.S. PATENT DOCUMENTS

| | | | | |
|---|---|---|---|---|
| 4,594,676 A * | 6/1986 | Breiholz et al. | ............... | 702/143 |
| 5,477,226 A * | 12/1995 | Hager et al. | .................. | 342/120 |
| 5,596,325 A | 1/1997 | Maas | ................ | 342/28 |
| 5,719,581 A | 2/1998 | Poe | ................ | 342/120 |
| 5,757,311 A * | 5/1998 | Voyce | ................ | 342/130 |
| 5,999,118 A | 12/1999 | Hethuin et al. | ............... | 342/122 |
| 6,072,426 A | 6/2000 | Roos | ............... | 342/174 |
| 6,384,770 B1 | 5/2002 | de Gouy et al. | ............... | 342/120 |
| 6,426,717 B1 * | 7/2002 | Maloratsky | ................... | 342/122 |
| 6,437,730 B1 | 8/2002 | Orlandi | ......................... | 342/122 |
| 6,476,759 B2 | 11/2002 | Orlandi | ......................... | 342/122 |
| 6,529,162 B2 | 3/2003 | Newberg et al. | ............... | 342/375 |
| 6,812,885 B2 | 11/2004 | Brettner, III et al. | ......... | 342/173 |
| 6,992,614 B1 * | 1/2006 | Joyce | ............................. | 342/122 |
| 7,161,530 B2 | 1/2007 | Christian et al. | .............. | 342/174 |
| 7,239,266 B2 * | 7/2007 | Vacanti | ........................ | 342/120 |
| 7,281,025 B2 | 10/2007 | Sullivan et al. | ............... | 708/271 |
| 7,295,151 B2 * | 11/2007 | Vacanti | ....................... | 342/173 |
| 7,327,308 B2 | 2/2008 | Cheng et al. | ................... | 342/165 |
| 7,420,503 B2 | 9/2008 | Uchino | ............................ | 342/70 |
| 2004/0130482 A1 * | 7/2004 | Lin et al. | ......................... | 342/82 |
| 2009/0058714 A1 * | 3/2009 | Vacanti | ......................... | 342/120 |

* cited by examiner

*Primary Examiner* — John B Sotomayor
*Assistant Examiner* — Marcus Windrich
(74) *Attorney, Agent, or Firm* — Samuel M. Korte; Mohammad M. Ali

(57) ABSTRACT

A method for determining a height above ground of an aircraft broadly comprises the steps of generating a transmit signal with a transmitter, transmitting the transmit signal with a first antenna, generating a local oscillator signal with a local oscillator, receiving a receive signal with a second antenna, mixing the receive signal with the local oscillator signal to generate a baseband signal, determining a frequency of interest of the baseband signal, and calculating an aircraft altitude corresponding to the frequency of interest.

37 Claims, 5 Drawing Sheets

DIGITAL RADAR ALTIMETER

BACKGROUND

Embodiments of the present technology relate to aircraft altimeter systems. A radar or radio altimeter measures the distance between an aircraft and the ground, or structures on the ground such as buildings, trees, and the like, below the aircraft. Radar altimeter systems often use frequency modulated continuous wave (FMCW) radar techniques to determine the height of the aircraft above ground. Such a system generally transmits a signal whose frequency varies with time to the ground below the aircraft, receives the signal that is reflected back, and mixes or multiplies the received signal with a local oscillator signal that is related to the transmitted signal. The difference in frequency between the received signal and the local oscillator signal (derived from the mixing operation) may be used to determine the height above ground of the aircraft.

SUMMARY

When an aircraft is flying at very low altitudes, or on the ground, the difference in frequency between a received signal from the ground and a local oscillator signal in an FMCW altimeter system may be very small and difficult to determine. In order to make the frequency difference larger and easier to determine, signal delaying components, such as a minimum length of cable, may be added between the radar altimeter and its antenna(s). These components may be bulky and add weight to the aircraft.

Embodiments of the present technology provide a digital radar altimeter system that electronically controls the time delay or frequency difference between the transmitted signal (and, in turn, the received signal) and the local oscillator signal, thereby setting up a minimum difference frequency at the output of the mixer. Embodiments of the present technology also provide a method for determining a height above ground of an aircraft broadly comprising the steps of generating a transmit signal with a transmitter, transmitting the transmit signal with a first antenna, generating a local oscillator signal with a local oscillator, receiving a receive signal with a second antenna, mixing the receive signal with the local oscillator signal to generate a baseband signal, determining a frequency of interest of the baseband signal, and calculating an aircraft altitude corresponding to the frequency of interest.

In some configurations, embodiments of the present technology provide low-cost and robust self test functionality that can be used to validate the operation of the altimeter system and/or detect failures within the altimeter system. Validating the operation of a radar altimeter can be of high importance in avionics systems.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

Figure 1:
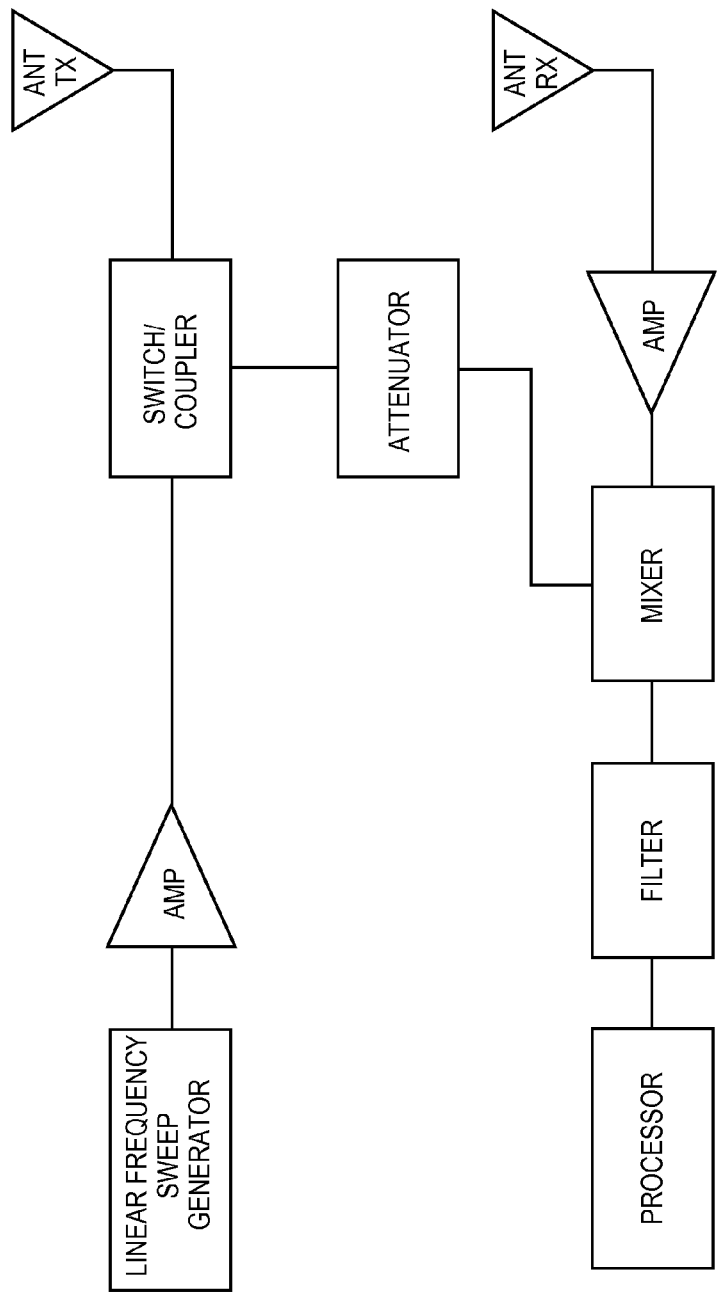
FIG. 1 is a schematic block diagram of a prior art radar altimeter system.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Various embodiments of the present technology may include a digital radar altimeter system to measure the height above ground of an aircraft. Altimeter systems often use radar technology, specifically, frequency modulated continuous wave (FMCW) radar, to determine the height of the aircraft above ground. Generally, the FMCW system produces a transmit signal with a frequency that is modulated or swept between a lower frequency and an upper frequency. The transmit signal is transmitted as radio waves to the ground and reflected back to the aircraft. Because the transmit signal is always shifting to a new frequency, the difference in frequency at any instant in time between the transmitted signal and the received signal can be used to derive the time of flight of the radio waves. The distance traveled by the radio waves is their speed (the speed of light) multiplied by the time of flight. Since the total distance traveled is the distance to the ground and back to the aircraft, the altitude of the aircraft is half the total distance traveled by the radio waves.

A conventional FMCW radar altimeter system may include a linear frequency sweep generator, a transmit antenna, a receive antenna, a mixer, and a processor, as shown in FIG. 1. The linear frequency sweep generator may generate a signal that is amplified to become the transmit signal. The transmit antenna may generate radio waves corresponding to the transmit signal. A portion of the transmit signal may also be coupled to produce a local oscillator signal with the same frequency as the transmit signal. The receive antenna may receive the radio waves reflected from the ground and generate a received signal which is amplified and mixed with the local oscillator signal. The mixer may output a difference signal which includes the difference in frequency between the local oscillator signal and the received signal. The difference signal may be filtered and communicated to the processor. The processor may determine the frequency of the difference signal and compute the altitude of the aircraft by performing the calculations discussed above.

A drawback with the conventional FMCW radar altimeter system is that at very low altitudes or when the aircraft is on the ground the frequency of the difference signal may become very small and too difficult for the processor to determine. As a result, the performance of the altimeter system may suffer when the aircraft is very close to or on the ground. In order to compensate for this problem, the conventional FMCW radar altimeter system may require lengthy antenna cables that couple to the transmit antenna and the receive antenna in order to add a fixed time delay to the received signal. Added delay to the received signal results in a minimum difference frequency in the radar altimeter that can more easily be determined leading to accurate and valid readings of altitude when the aircraft is very close to or on the ground. However, not only do the delay-inducing antenna cables take up a significant amount of space, but they also add significant weight to the aircraft which in turn requires more fuel for each flight.

Embodiments of the present technology eliminate the need for delay-inducing signal cables by electronically controlling the time delay or frequency difference between the transmitted signal (and, in turn, the received signal) and the local oscillator signal. Thus, a minimum difference frequency is ensured without additional cabling or other time delaying devices. Furthermore, the minimum difference frequency may be adjusted through software commands as needed or swept to test the performance of the system.

Figure 2:
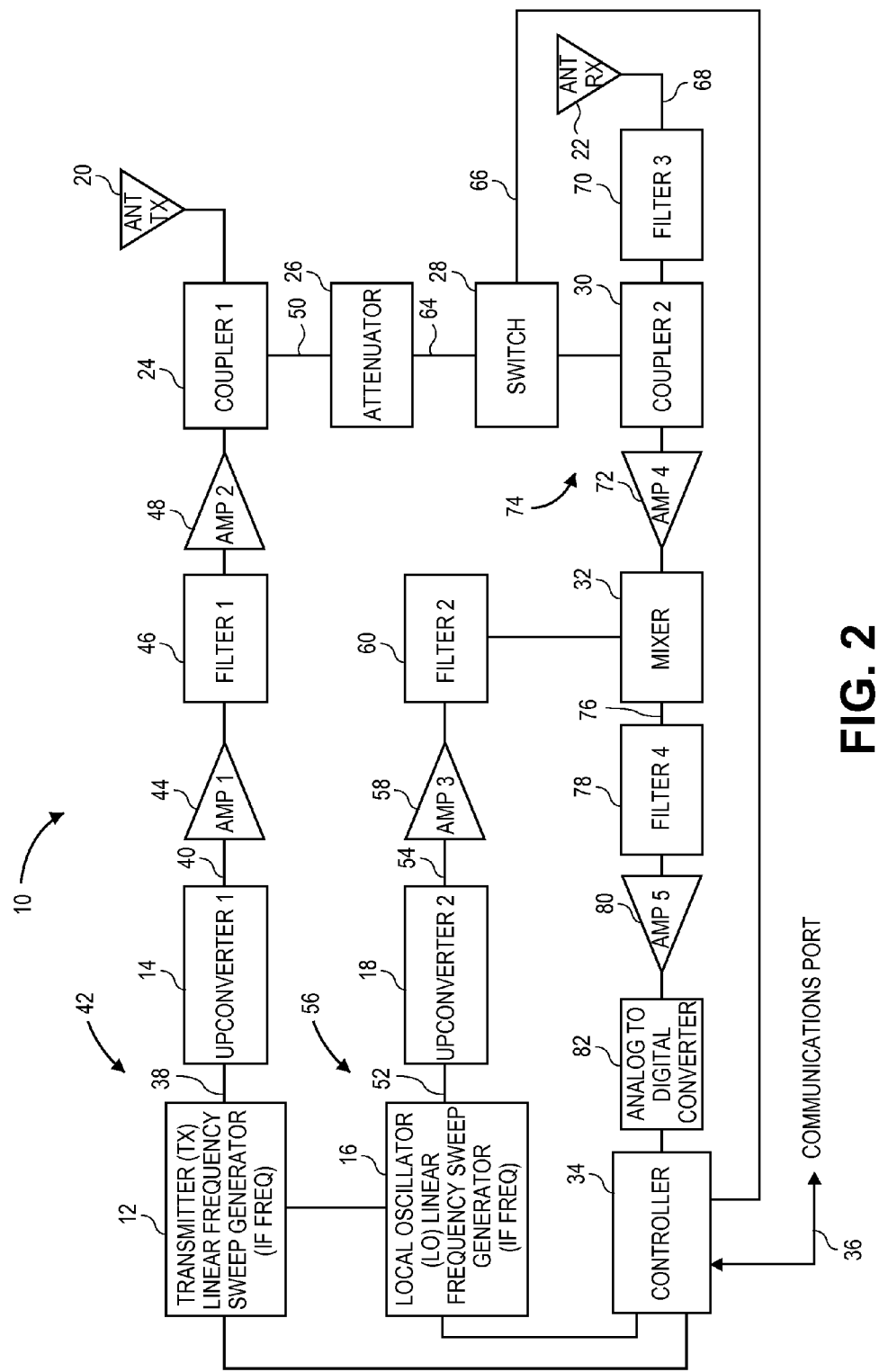
FIG. 2 is a schematic block diagram of a digital radar altimeter system constructed in accordance with various embodiments of the present technology.

Embodiments of the technology will now be described in more detail with reference to the drawing figures. Referring initially to FIG. 2, a digital radar altimeter system 10 of the present technology is illustrated and may broadly comprise a transmitter linear frequency sweep generator 12, a first upconverter 14, a local oscillator linear frequency sweep generator 16, a second upconverter 18, a transmit antenna 20, a receive antenna 22, a first coupler 24, an attenuator 26, a radio frequency (RF) switch 28, a second coupler 30, a mixer 32, a controller 34, and a communications port 36. The system 10 may also include a plurality of amplifiers and a plurality of filters.

The transmitter linear frequency sweep generator 12 generally includes components that are capable of generating an oscillating periodic signal whose frequency may be varied or swept, such as crystal oscillators, oscillator circuits, voltage-controlled oscillator circuits, multivibrator circuits, programmable digital signal processors with digital to analog converters, and the like, or combinations thereof. An exemplary transmitter linear frequency sweep generator 12 is a linear frequency sweep generator such as a direct digital synthesizer (DDS). In one embodiment, the DDS may be the AD9954 single channel DDS manufactured by Analog Devices of Norwood, Mass.

The transmitter linear frequency sweep generator 12 may generate an intermediate transmit signal 38 at an intermediate frequency (IF) range. The intermediate transmit signal 38 may be a periodic signal such as a sine wave whose frequency may be swept by the transmitter linear frequency sweep generator 12 in a linear fashion. Typically, the frequency is increased from a first frequency to a second frequency over a first time period, known as an upsweep, and decreased back to the first frequency over a second time period (usually equivalent to the first time period), known as a downsweep. This pattern is repeated. The duration (period) of the first or second time periods may be known as the sweep time, $t_s$. In various embodiments, the sweep time $t_s$=2 milliseconds (ms). Furthermore, the first frequency may be approximately 98.8 megahertz (MHz), and the second frequency may be approximately 101.2 MHz, although other frequency ranges are possible.

Figure 3:
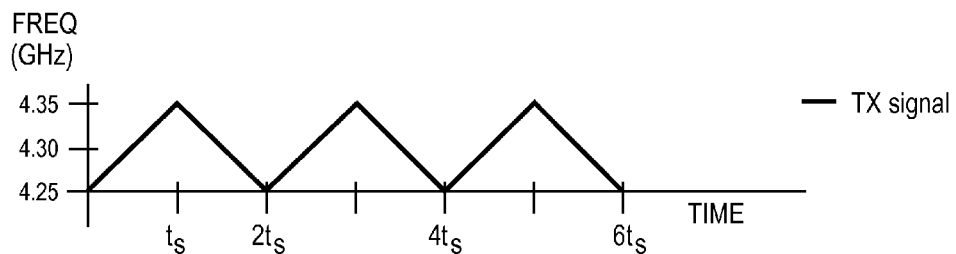
FIG. 3 is a graph of frequency versus time for a transmit signal of the digital radar altimeter system.

The intermediate transmit signal 38 may be upconverted to a radio frequency range by the first upconverter 14 to produce a transmit signal 40 (denoted in the figures as "TX signal"), which is substantially the same as the intermediate transmit signal 38 after upconverting to the radio frequency range. The first upconverter 14 may include frequency shifting, converting, or generating circuitry such as phase-locked loops (PLLs), voltage-controlled oscillators (VCOs), mixers or multiplying devices, and the like, or combinations thereof. After being upconverted, the transmit signal 40 may have a frequency range from approximately 4.25 gigahertz (GHz) to approximately 4.35 GHz, swept over the sweep time $t_s$, as shown in FIG. 3. Other frequency ranges are possible, although the Federal Aviation Administration, the Federal Communication Commission, or other federal or government agencies may require that the transmitted frequency of a low-range radio altimeter system be within the extents of 4.2 GHz to 4.4 GHz. The transmitter linear frequency sweep generator 12 in combination with the first upconverter 14 may also be known as a transmitter 42.

The transmit signal 40 may be amplified and filtered by a first amplifier 44, a first filter 46, and a second amplifier 48. The first amplifier 44 may include standard signal amplifying and/or buffering circuitry. The first filter 46 may include standard passive and/or active filtering circuitry. The second amplifier 48 may be a broadband power amplifier and may include multistage signal amplifying circuitry.

The first coupler 24 generally includes components that are capable of splitting a signal or coupling a first signal into a second signal. The first coupler 24 may include active or passive microwave devices such as signal splitters or inductive couplers. An exemplary first coupler 24 may be implemented as two signal traces in close proximity to one another on a printed circuit board, either adjacent to one another on the same layer or vertically aligned on consecutive layers. The first coupler 24 may receive the transmit signal from the second amplifier 48 and may pass the transmit signal 40 to the transmit antenna 20. The first coupler 24 may also output a test signal 50, which corresponds to a lower power version of the transmit signal 40.

The transmit antenna 20 generally includes components that are capable of converting an electronic signal into radio waves. The transmit antenna 20 may be omni-directional, but typically, it is directional. The transmit antenna 20 may be sized and/or shaped to transmit the transmit signal 40, which may have a frequency range from approximately 4.25 GHz to approximately 4.35 GHz and a power of approximately +30 dBm or less. The transmit antenna 20 may be positioned along a lower, exterior portion of the aircraft, such as the bottom of an aircraft wing or fuselage. The transmit antenna 20 may receive the transmit signal 40 from the second amplifier 48 as passed through the first coupler 24 and may generate radio waves that are transmitted toward the ground beneath the aircraft and reflected back to the receive antenna 22.

The local oscillator linear frequency sweep generator 16 generally includes components that are capable of generating an oscillating periodic signal whose frequency may be varied or swept and may be substantially similar to the transmitter linear frequency sweep generator 12. An exemplary local oscillator linear frequency sweep generator 16 is a linear frequency sweep generator such as a direct digital synthesizer (DDS). In one embodiment, the DDS is the AD9954 single channel DDS. Furthermore, the local oscillator linear frequency sweep generator 16 may be able to communicate with the transmitter linear frequency sweep generator 12 and vice-versa in order to synchronize the operation of the two generators 12, 16.

The local oscillator linear frequency sweep generator 16 may generate an intermediate local oscillator signal 52 which may be a periodic signal such as a sine wave at an IF range. Like the intermediate transmit signal 38, the intermediate local oscillator signal 52 may also have its frequency swept over a certain frequency range by the local oscillator linear frequency sweep generator 16. Furthermore, the intermediate local oscillator signal 52 may be upconverted by the second upconverter 18 to produce a local oscillator signal 54 (denoted in the figures as "LO signal"). The second upconverter 18 may be substantially similar to the first upconverter 14 in construction and function. The local oscillator linear frequency sweep generator 16 in combination with the second upconverter 18 may also be known as a local oscillator 56.

The intermediate local oscillator signal 52 may be conditioned by a third amplifier 58 and a second filter 60. The third amplifier 58 may include standard signal amplifying and/or buffering circuitry and may be substantially similar to the first amplifier 44. The second filter 60 may include standard passive and/or active filtering circuitry, and may be substantially similar to the first filter 46.

In addition, the system 10 generates an instantaneous frequency difference $f_{diff}$ between the local oscillator signal 54 and the transmit signal 40. The frequency difference $f_{diff}$ between the two signals 40, 54 may be implemented by either time delaying the intermediate transmit signal 38 with respect to the intermediate local oscillator signal 52 or by frequency shifting the intermediate local oscillator signal 52 with respect to the intermediate transmit signal 38.

Figure 4:
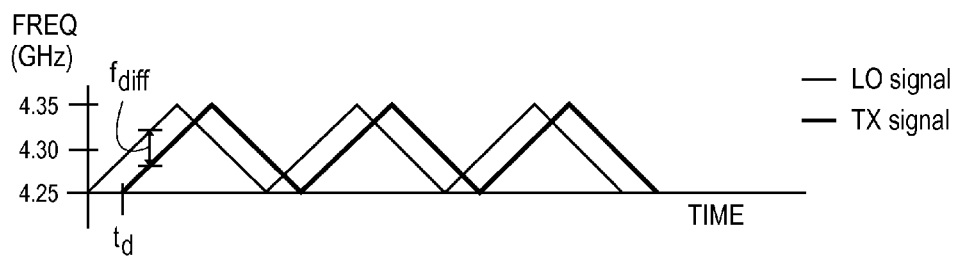
FIG. 4 is a graph of frequency versus time for a local oscillator signal and the time-delayed transmit signal of the digital radar altimeter system.

If the intermediate transmit signal 38 is time delayed with respect to the intermediate local oscillator signal 52, then the intermediate local oscillator signal 52 is generated at a starting frequency that is swept in the same fashion and over the same range as the intermediate transmit signal 38. In various embodiments, the intermediate local oscillator signal 52 and the intermediate transmit signal 38 may both be generated at an intermediate frequency over the range from approximately 98.8 MHz to approximately 101.2 MHz, although other frequency ranges are possible. Once the intermediate local oscillator signal 52 has been generated by the local oscillator linear frequency sweep generator 16, then, after a time delay $t_d$, the intermediate transmit signal 38 may be generated by the transmitter linear frequency sweep generator 12. Both the intermediate local oscillator signal 52 and the intermediate transmit signal 38 are upconverted to radio frequencies, as discussed above, to produce the local oscillator signal 54 and the transmit signal 40 with the frequency range from approximately 4.25 GHz to approximately 4.35 GHz. The time-delayed relationship between the local oscillator signal 54 and the transmit signal 40 is shown in FIG. 4. The time delay $t_d$ is variable and may be chosen to produce a certain frequency difference $f_{diff}$ between the local oscillator signal 54 and the transmit signal 40, although generally the time delay $t_d$ is much shorter than the sweep time $t_s$.

Figure 5:
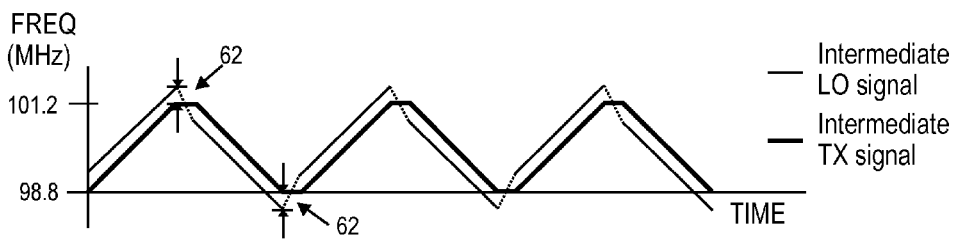
FIG. 5 is a graph of frequency versus time for a frequency-shifted intermediate local oscillator signal and an intermediate transmit signal of the digital radar altimeter system.

If the local oscillator signal 54 is directly frequency shifted from the transmit signal 40, then the intermediate transmit signal 38 may be generated by the transmitter linear frequency sweep generator 12 with a first frequency range, e.g., approximately 98.8 MHz to approximately 101.2 MHz. At approximately the same time, the local oscillator linear frequency sweep generator 16 may generate the intermediate local oscillator signal 52 with a first frequency offset 62 such that during the upsweep the frequency of the intermediate local oscillator signal 52 is greater than the frequency of the intermediate transmit signal 38, as shown in FIG. 5. Typically, the magnitude of the first frequency offset 62 from the local oscillator linear frequency sweep generator 16 is on the order of tens of Hertz to a few kilohertz. As the frequency of the intermediate transmit signal 38 is increased, so too is the frequency of the intermediate local oscillator signal 52 at the same slope as the intermediate transmit signal 38 and with the first frequency offset 62. During the downsweep, when the frequency of the intermediate transmit signal 38 is decreased, then the local oscillator linear frequency sweep generator 16 may generate the intermediate local oscillator signal 52 with the first frequency offset 62 in the negative direction such that the frequency of the intermediate local oscillator signal 52 is less than the frequency of the intermediate transmit signal 38. As the frequency of the intermediate transmit signal 38 is decreased, the local oscillator linear frequency sweep generator 16 may decrease the frequency of the intermediate local oscillator signal 52 with the same slope as the intermediate transmit signal 38 and with the first frequency offset 62. When the frequency of the transmit signal 40 increases again, the local oscillator linear frequency sweep generator 16 may generate the local oscillator signal 54 with the first frequency offset 62. This pattern may continue indefinitely.

Figure 6:
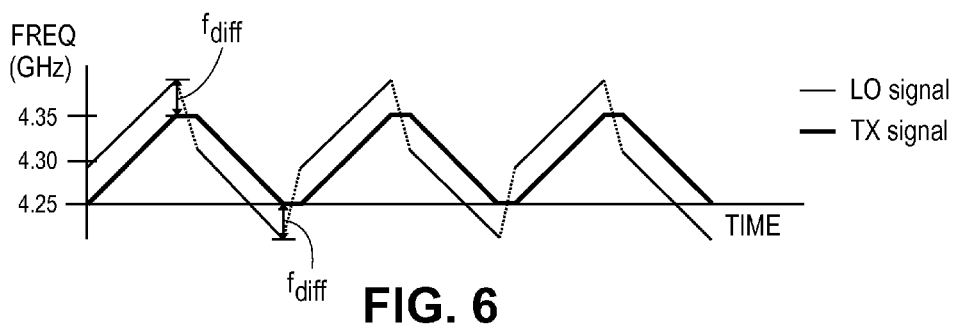
FIG. 6 is a graph of frequency versus time for the frequency-shifted local oscillator signal and the transmit signal of the digital radar altimeter system.

The intermediate transmit signal 38 may be upconverted to produce the transmit signal 40 with a frequency range of approximately 4.25 GHz to approximately 4.35 GHz, as shown in FIG. 6. The intermediate local oscillator signal 52 may be upconverted to the local oscillator signal 54. The first frequency offset 62 may be upconverted as well to produce the frequency difference $f_{diff}$. Thus, the frequency range of the local oscillator signal 54 when the frequency is increasing may be approximately 4.25 GHz plus the frequency difference $f_{diff}$ to approximately 4.35 GHz plus the frequency difference $f_{diff}$. The frequency range of the local oscillator signal 54 when the frequency is decreasing may be approximately 4.35 GHz minus the frequency difference $f_{diff}$ to approximately 4.25 GHz minus the frequency difference $f_{diff}$. The magnitude of the frequency difference $f_{diff}$ may be on the order of hundreds of Hertz to tens of kilohertz.

Under some conditions, the local oscillator linear frequency sweep generator 16 may not be able to instantaneously shift frequencies when the slope of the frequency of the transmit signal 40 changes from positive to negative or vice-versa. Thus, there may be a lag or time delay from the time at which the local oscillator linear frequency sweep generator 16 stops generating the local oscillator signal 54 with an increasing frequency to the time at which the local oscillator linear frequency sweep generator 16 starts generating the local oscillator signal 54 with a decreasing frequency. Accordingly, the transmitter linear frequency sweep generator 12 may be configured to delay the start of decreasing the frequency of the transmit signal 40 after the end of increasing the frequency of the transmit signal 40, as shown in FIG. 6.

The attenuator 26 generally includes components to reduce the amplitude of an electronic signal, such as resistive components, capacitive components, inductive components, other loads, or combinations thereof. The attenuator 26 may reduce the power of an input signal. The attenuator 26 may receive the test signal 50 from the first coupler 24 and may reduce its power to produce a lower power test signal 64.

The RF switch 28 generally includes components that are capable of making or breaking a connection between two terminals. Thus, the RF switch 28 may be of a single-pole, single-throw type and may include solid state switching or electrically-controlled mechanical switching, such as solid state relays or electromagnet relays. The RF switch 28 may include a control input line that determines the open or closed state of the RF switch 28. A first terminal of the RF switch 28 may be connected to the attenuator 26. A second terminal of the switch may be connected to the second coupler 30. The control input line may receive a binary test control signal 66 from the controller 34. The RF switch 28 may output the low power test signal 64, if the test control signal 66 is asserted to close the RF switch 28. When the test control signal 66 is asserted to open the RF switch 28, no signal is supposed to be output, although a small signal may leak from the RF switch 28.

The receive antenna 22 generally includes components that are capable of converting radio waves into an electronic signal. The receive antenna 22 may be sized and/or shaped to receive radio waves which have a frequency range from approximately 4.25 GHz to approximately 4.35 GHz and a power ranging from approximately −5 dBm to approximately −90 dBm. The receive antenna 22 may be positioned along a lower, exterior portion of the aircraft, such as the bottom of an aircraft wing or fuselage. The receive antenna 22 may produce a receive signal 68, which is generally the transmit signal 40 that has been transmitted by the transmit antenna 20 and reflected from the ground to the receive antenna 22.

The receive signal 68 may be conditioned by a third filter 70 including standard signal filtering components, such as bandpass filters. The output of the third filter 70 is connected to the second coupler 30. If the RF switch 28 is closed, then the receive signal 68 is coupled with the low power test signal 64. If the RF switch 28 is open, then the receive signal 68 passes through the second coupler 30 with the low power test signal substantially attenuated. The receive signal 68 may be further conditioned by a fourth amplifier 72. The fourth amplifier 72 may include components to amplify weak signals, such as broadband low noise amplifiers. The receive antenna 22 in combination with the third filter 70 and the fourth amplifier 72 may also be known as a receiver 74.

The mixer 32 generally includes components that are capable of mixing or multiplying two signals together, such as active and passive electric mixer circuits. An exemplary mixer 32 is the HMC213AMS8E from Hittite Microwave Corporation of Chelmsford, Mass. The mixer 32 may receive the local oscillator signal 54 from the second filter 60 and the receive signal 68 from the fourth amplifier 72. The mixer 32 may output a baseband signal 76 that includes both the sum and the difference of the frequencies of the local oscillator signal 54 and the receive signal 68.

The baseband signal 76 may be conditioned by a fourth filter 78 and a fifth amplifier 80. The fourth filter 78 may include filtering circuits, such as low-pass filters to filter out the sum of the frequencies of the local oscillator signal 54 and the receive signal 68 and any residual frequencies thereof in order to band-limit the signal.

When the aircraft is at lower altitudes, the receive signal 68 may have a greater amplitude than the receive signal 68 at higher altitudes. Since the baseband signal 76 is the product of the local oscillator signal 54 and the receive signal 68, the fourth filter 78 may further include a loop-loss compensation filter to equalize the frequency response of the baseband signal 76 over a range of frequencies. The fifth amplifier 80 may also include equalizing components, such as variable gain amplifiers. The baseband signal 76 from the fifth amplifier 80 may be converted to a digital form by an analog-to-digital converter (ADC) 82.

The controller 34 generally includes components that are capable of executing computer programs, applications, software, code, instructions, algorithms, or firmware, and combinations thereof. The controller 34 may include circuitry, such as finite state machines (FSMs), that automatically performs instructions. The controller 34 may also include processors, microprocessors, digital signal processors (DSPs), microcontrollers, field-programmable gate arrays (FPGAs), application-specific integrated circuits (ASICs), combinations thereof, and the like, and may be implemented using hardware description languages (HDLs), such as Verilog and VHDL. An exemplary processor included with the controller 34 is a Blackfin® processor from Analog Devices. The controller 34 may further include data storage components such as read-only memory (ROM), random-access memory (RAM), hard-disk drives, optical disk drives, flash memory drives, combinations thereof, and the like.

The controller 34 may include the communications port 36 to allow for external communication, reporting of altitude, programming, or other miscellaneous functions. The communications port 36 may act as an interface between the digital radar altimeter system 10 and other systems and may include serial and/or parallel data buses and control lines. The communications port 36 may be wired or wireless, electronic, optical, radio frequency (RF), combinations thereof, and the like.

The controller 34 may communicate with the transmitter linear frequency sweep generator 12 and the local oscillator linear frequency sweep generator 16 in order to set the signal outputs of the transmitter linear frequency sweep generator 12 and the local oscillator linear frequency sweep generator 16. The controller 34 may indicate the frequency ranges of the intermediate transmit signal 38 and the intermediate local oscillator signal 52. Furthermore, the controller 34 may send trigger signals to the transmitter linear frequency sweep generator 12 and the local oscillator linear frequency sweep generator 16 to begin or continue outputting the intermediate transmit signal 38 and the intermediate local oscillator signal 52 at specific times.

The controller 34 may also generate the test control signal 66 that connects to the RF switch 28 and sets the state of the RF switch 28. The test control signal 66 may be binary and in one state, may close the RF switch 28 such that the low power test signal 64 is coupled with the receive signal 68. In the other state, the RF switch 28 is open and the low power test signal 64 is substantially not coupled with the receive signal 68.

The controller 34 may receive the baseband signal 76 and may determine the exact frequency of interest of the baseband signal 76. The controller 34 may employ many techniques to determine the frequency of interest of the baseband signal 76. However, an exemplary method is as follows.

The method generally determines the frequency of interest in stages—first determining a window in which the frequency may occur and then utilizing algorithms to focus within the window. The baseband signal 76 may be sampled by the controller 34 at a sampling frequency of approximately 2 megahertz (MHz) and approximately two thousand samples may be stored. The controller 34 may perform a 512-point Fast Fourier transform (FFT) on the sampled data points. The output of the FFT is generally a plurality of numbers (in this case, 512), each representing the magnitude of a frequency component. The controller 34 may analyze the output of the 512-point FFT to determine the largest magnitude frequency component other than the frequency component of a baseband frequency, which is related to the frequency difference $f_{diff}$, as described in more detail below. The controller 34 may then establish an upper frequency bound and a lower frequency bound with the largest magnitude frequency component being in the center of the two.

The controller 34 may subsequently perform a 2,048-point FFT on the sampled data points and analyze only that portion of the output that is within the upper frequency bound and the lower frequency bound. The FFT output may include many frequencies with magnitudes that are above the level of noise. Of those, the controller 34 may choose the lowest frequency with a magnitude above the level of noise.

The controller 34 may utilize the frequency chosen from the output of the 2,048-point FFT to set the parameters for a Goertzel algorithm implementation. The Goertzel algorithm is a discrete time domain to frequency domain transformation that can be used to detect the presence of specific frequencies in a sampled data set. The Goertzel algorithm was disclosed in an article entitled "An Algorithm for the Evaluation of Finite Trigonometric Series", published in American Mathematical Monthly, January, 1958, volume 65, number 1, pp. 34-35. The controller 34 may perform the Goertzel algorithm on the sampled data. The output of the Goertzel algorithm is generally one or more numbers, each representing the magnitude of a frequency component, wherein the frequency components may be specified or chosen before the Goertzel algorithm is applied. The controller 34 may determine which frequency component has the greatest magnitude and may choose that frequency as the frequency of interest in the baseband signal 76.

The controller 34 may calculate the altitude of the aircraft by calculating the time of travel of the reflected radio wave signal (which is the transmit signal 40) based on the chosen frequency of interest of the baseband signal 76 and the rate of change of the frequency of the transmit signal 40, wherein the time is the frequency divided by the rate of change. The distance traveled by the radio waves is the speed of light multiplied by the time of travel. The altitude is calculated as half the distance. The altitude may be communicated on the communications port 36, typically in terms of feet above ground level (AGL). The communications port 36 may be coupled with various components of an avionics system, such as a primary flight display (PFD) or other altitude indicator, on which the altitude determined by the controller 34 may be displayed to a pilot and/or co-pilot.

The controller 34 may determine the frequency of interest of the baseband signal 76 and perform a first altitude calculation, as discussed above, when the transmit signal 40 and the local oscillator signal 54 are generated during an upsweep. The controller 34 may determine the frequency of interest of the baseband signal 76 and perform a second altitude calculation when the signals 40, 54 are generated during a downsweep. The controller 34 may then average the first altitude calculation and the second altitude calculation to derive the height above ground of the aircraft that is reported to other systems. In various embodiments, the controller 34 may compute the height every approximately 6 ms. Furthermore, the controller 34 may apply a low-pass filter function to the output of the height computation to provide a smooth stream of altitude readings.

The digital radar altimeter system 10 may operate as follows. The system 10 may have two modes of operation—normal mode and built-in self test mode. During normal operation, the controller 34 may communicate with the transmitter linear frequency sweep generator 12 to generate the intermediate transmit signal 38 and with the local oscillator linear frequency sweep generator 16 to generate the intermediate local oscillator signal 52. The intermediate transmit signal 38 may be time delayed with respect to the intermediate local oscillator signal 52, or the intermediate local oscillator signal 52 may be frequency shifted with respect to the intermediate transmit signal 38 depending upon the implementation chosen. The transmitter linear frequency sweep generator 12 may generate the intermediate transmit signal 38 with a frequency range from approximately 98.8 MHz to approximately 101.2 MHz. If the intermediate transmit signal 38 is time delayed, then the transmitter linear frequency sweep generator 12 may generate the intermediate transmit signal 38 at a time delay $t_d$ after the intermediate local oscillator signal 52 is generated. The local oscillator linear frequency sweep generator 16 may generate the intermediate local oscillator signal 52 at the same frequency range. If a frequency shift implementation is chosen, then the intermediate transmit signal 38 and the intermediate local oscillator signal 52 may be generated at basically the same time. But, the local oscillator linear frequency sweep generator 16 may generate the intermediate local oscillator signal 52 at a shifted frequency range with the first frequency offset 62, as shown in FIG. 5.

The intermediate transmit signal 38 may be upconverted by the first upconverter 14 to the transmit signal 40 with a range from approximately 4.25 GHz to approximately 4.35 GHz. The transmit signal 40 may then be amplified by the first amplifier 44 and the second amplifier 48 and transmitted as radio waves by the transmit antenna 20. Generally, the transmit antenna 20 aims the radio waves toward the ground beneath the aircraft.

The intermediate local oscillator signal 52 may be upconverted by the second upconverter 18 to the local oscillator signal 54 with a range from approximately 4.25 GHz to approximately 4.35 GHz. The local oscillator signal 54 may then be amplified and filtered by the third amplifier 58 and the second filter 60. If the local oscillator signal 54 is frequency shifted, then the frequency range may be from approximately 4.25 GHz to approximately 4.35 GHz plus and minus the frequency difference $f_{diff}$.

The receive antenna 22 may receive the transmitted radio waves that are reflected from the ground and may generate the receive signal 68 corresponding to the received radio waves. The receive signal 68 may be filtered and amplified by the third filter 70 and the fourth amplifier 72.

The receive signal 68 may be mixed with the local oscillator signal 54 to create the baseband signal 76, which may include the sum and the difference of the frequencies of the two signals 54, 76. The baseband signal 76 may be conditioned by the fourth filter 78 and the fifth amplifier 80 to remove the sum of the frequencies, to bandlimit the signal, and to equalize the magnitude of the baseband signal 76 across a range of frequencies that may be generated by the transmitted radio waves reflected at different altitudes. The baseband signal 76, which has a frequency range that is the difference between the frequency of the receive signal 68 and the local oscillator signal 54, may be converted from analog to digital form by the ADC 82 and then communicated to the controller 34.

The controller 34 may determine the frequency of interest of the baseband signal 76. The controller 34 may time sample the baseband signal 76 via the analog to digital converter 82. The controller 34 may then perform a first FFT (of 512 points) to determine a window in which the main frequency exists. The controller 34 may perform a second FFT (of 2,048 points) to determine a likely frequency within the window. The controller 34 may perform a Goertzel algorithm calculation using the frequency of the second FFT to establish the parameters of the Goertzel algorithm. The controller 34 may determine the exact frequency component from the output of the Goertzel algorithm with the greatest magnitude to be the frequency of the baseband signal 76 chosen. Given the frequency and the rate of change of the transmit signal 40, the controller 34 may calculate the altitude of the aircraft by calculating the time of flight of the reflected radio waves as the frequency divided by the rate of change. The altitude may be calculated as the time of flight multiplied by the speed of light divided by two.

The controller 34 may determine the frequency of interest of the baseband signal 76 and perform a first altitude calculation, as discussed above, when the transmit signal 40 and the local oscillator signal 54 are generated during an upsweep. The controller 34 may determine the frequency of interest of the baseband signal 76 and perform a second altitude calculation when the signals 40, 54 are generated during a downsweep. The controller 34 may then average the first altitude calculation and the second altitude calculation to derive the height above ground of the aircraft. The height may be derived by the controller 34 every approximately 6 ms. The controller 34 may also apply a low-pass filter function to the calculation of the altitude before the altitude is reported to the communications port 36. The digital radar altimeter system 10 may be coupled to other aircraft electronic equipment, such that the altitude from the system 10 may be displayed on a monitor or readout in an aircraft cockpit.

After the system 10 is installed in an aircraft, but before it is used in normal operation, the system 10 may be calibrated to indicate zero feet altitude when the aircraft is on the ground or when the main landing gear has touched the ground. The transmitter linear frequency sweep generator 12 may generate the intermediate transmit signal 38, and the local oscillator linear frequency sweep generator 16 may generate the intermediate local oscillator signal 52, as described above for normal operation. The time delay of the intermediate transmit signal 38 may be adjusted, or the frequency shift of the intermediate local oscillator signal 52, and hence, the frequency difference $f_{diff}$, may be adjusted until the frequency of the baseband signal 76 is stable and is in a range acceptable and easy to determine by the controller 34. This frequency may be referred to as the calibrated baseband frequency and may be stored to represent zero feet of altitude for the aircraft. Alternatively, a certain time delay of the intermediate transmit signal 38 or frequency offset of the intermediate local oscillator signal 52 may be chosen and the resulting baseband signal 76 frequency may be referred to as the calibrated baseband frequency and may be stored to represent zero feet of altitude for the aircraft.

Figure 8:
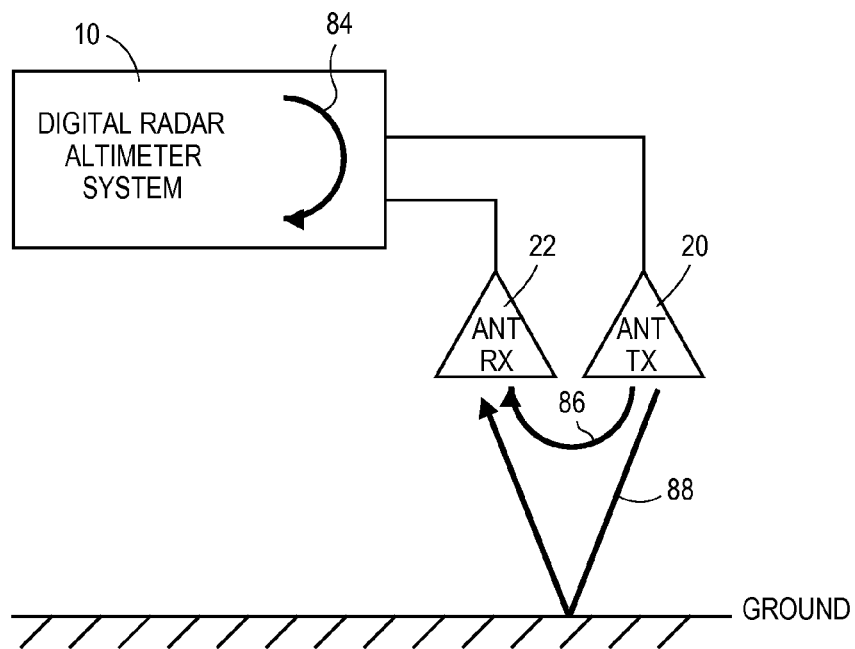
FIG. 8 is a schematic block diagram of the digital radar altimeter system illustrating a plurality of signal feedback paths for a system self test.

In the built-in self test mode, the system 10 may utilize at least one of three feedback paths, as shown in FIG. 8, to verify component performance. An internal feedback path 84 may be internal to a housing of at least a portion of the system 10, an antenna coupling feedback path 86 may include a path from the transmit antenna 20 through ambient, non-reflected radiation to the receive antenna 22, and a ground return feedback path 88 may include a path from the transmit antenna 20 through reflected radiation from the ground to the receive antenna 22.

Figure 9:
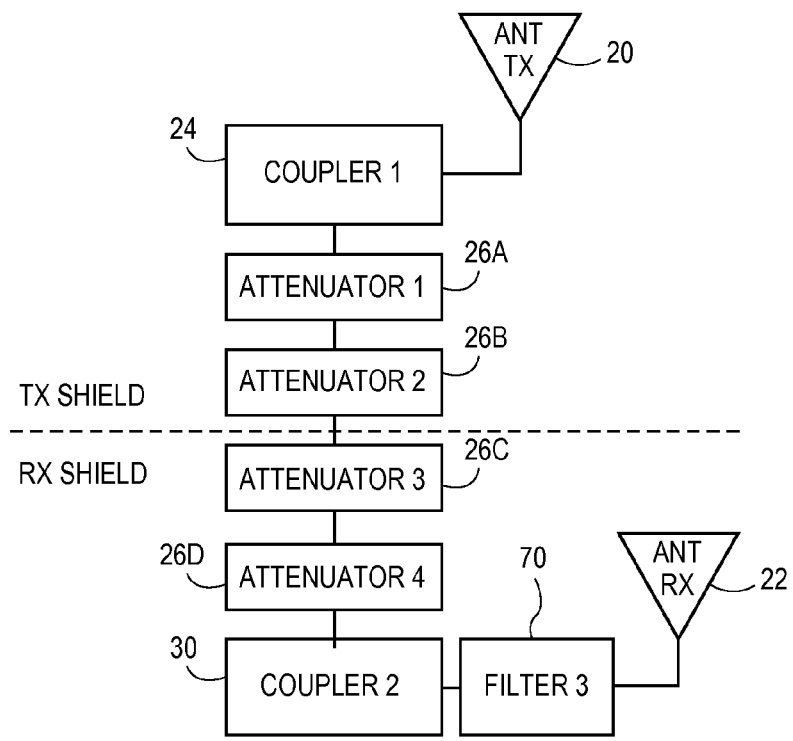
FIG. 9 is a schematic block diagram of an alternate embodiment of a self test portion of the digital radar altimeter system.

When utilizing the first feedback path 84, the system 10 may rely on internal leakage, a first embodiment of the self test path shown in FIG. 2, or a second embodiment of the self test path shown in FIG. 9. Internal leakage may be the result of electromagnetic (EM) radiation that is emitted by the transmitter 42 and received in small amounts by the receiver 74. The radiation from the transmitter 42 may be received by the receiver 74 in spite of transmitter and receiver EM shielding designed to prevent leakage that is indicated in FIG. 9.

The first embodiment of the self test path includes the attenuator 26 and the RF switch 28. In self test mode, the controller 34 may activate the test control signal 66 to close the RF switch 28 to allow the low power test signal 64 to couple with the receive signal 68. The transmit signal 40 may be coupled by the first coupler 24 to create the test signal 50 which is further attenuated to create the low power test signal 64. The combination of the low power test signal 64 and the receive signal 68 may then be mixed with the local oscillator signal 54 to create a test version of the baseband signal 76 which is analyzed by the controller 34.

The second embodiment of the self test path eliminates the RF switch 28 but includes a plurality of attenuators 26 that are connected between the first coupler 24 and the second coupler 30. For example, the system 10 may include four attenuators 26A, 26B, 26C, 26D connected in series. The system 10 may include a plurality of attenuators 26 to reduce the effect of any single attenuator shorting to 0 decibel (dB) insertion loss. As with the first embodiment of the self test path, the transmit signal 40 may be coupled by the first coupler 24 to create the test signal 50 that is attenuated by attenuators 26A, 26B, 26C, 26D to create the low power test signal 64, which is then coupled with the receive signal 68.

In self test mode, the system 10 may operate in much the same way as it does in the normal mode to analyze the baseband signal 76, except that the system 10 does not output or communicate an indication of the aircraft altitude. However, in some configurations, the system 10 may float the previous altitude output so that an altitude may still be output even if altitude is not being actively calculated. If appropriate, the controller 34 may activate the test control signal 66 to close the RF switch 28. Otherwise, if the RF switch 28 is not included, then the transmitter linear frequency sweep generator 12 may generate the intermediate transmit signal 38 and the local oscillator linear frequency sweep generator 16 may generate the intermediate local oscillator signal 52, as described above. The first frequency offset 62 between the intermediate transmit signal 38 and the intermediate local oscillator signal 52 may be greater than 20 kHz. However, in some configurations as described above, a time delay may be utilized instead of, or in addition to, the frequency offset 62 such that the intermediate transmit signal 38 is delayed with respect to the intermediate local oscillator signal 52. The transmit signal 40 may follow any of the feedback paths 84, 86, 88 discussed above. The controller 34 may then analyze the resulting baseband signal 76.

The system 10 passes the self test if the frequency of the baseband signal 76 is equal to any one of at least three values plus or minus a tolerance factor. The value depends on the feedback path utilized, although any one of the three is valid. For the internal feedback path 84, the value is equal to the first frequency offset 62. For the antenna coupling feedback path 86, the value is equal to the first frequency offset 62 plus the loopback calibration baseband frequency. For the ground return feedback path 88, the value is equal to the first frequency offset 62 plus the frequency of the baseband signal 76 of the last calculated return. An exemplary tolerance factor may be 3 kHz to account for variations in system hardware components, altitude changes when switching modes, and/or the approximation of the antenna coupling baseband frequency. Generally, this procedure is repeated for a series of first frequency offsets 62, wherein the current first frequency offset 62 is at least 10 kHz greater than the previous first frequency offset 62. However, in some configurations as described above, a time delay may be utilized instead of, or in addition to, the frequency offset 62 such that the intermediate transmit signal 38 is delayed with respect to the intermediate local oscillator signal 52. If the system 10 fails the self test, then the controller 34 may output or communicate an indication of a self test failure.

The self test mode is operable to provide a low-cost and robust self-test function that can be used to validate the operation of the altimeter system 10 and/or detect failures within the altimeter system 10. In various embodiments, the self test may also include the following advantages: there are no switching components in the self test loop, there are no components with probable catastrophic failures in the self test loop, there are no control signals required, there is a low number of components required, the power entering the receiver 74 from the transmitter 42 is low, and the complexity of the self test circuitry is low.

Figure 7:
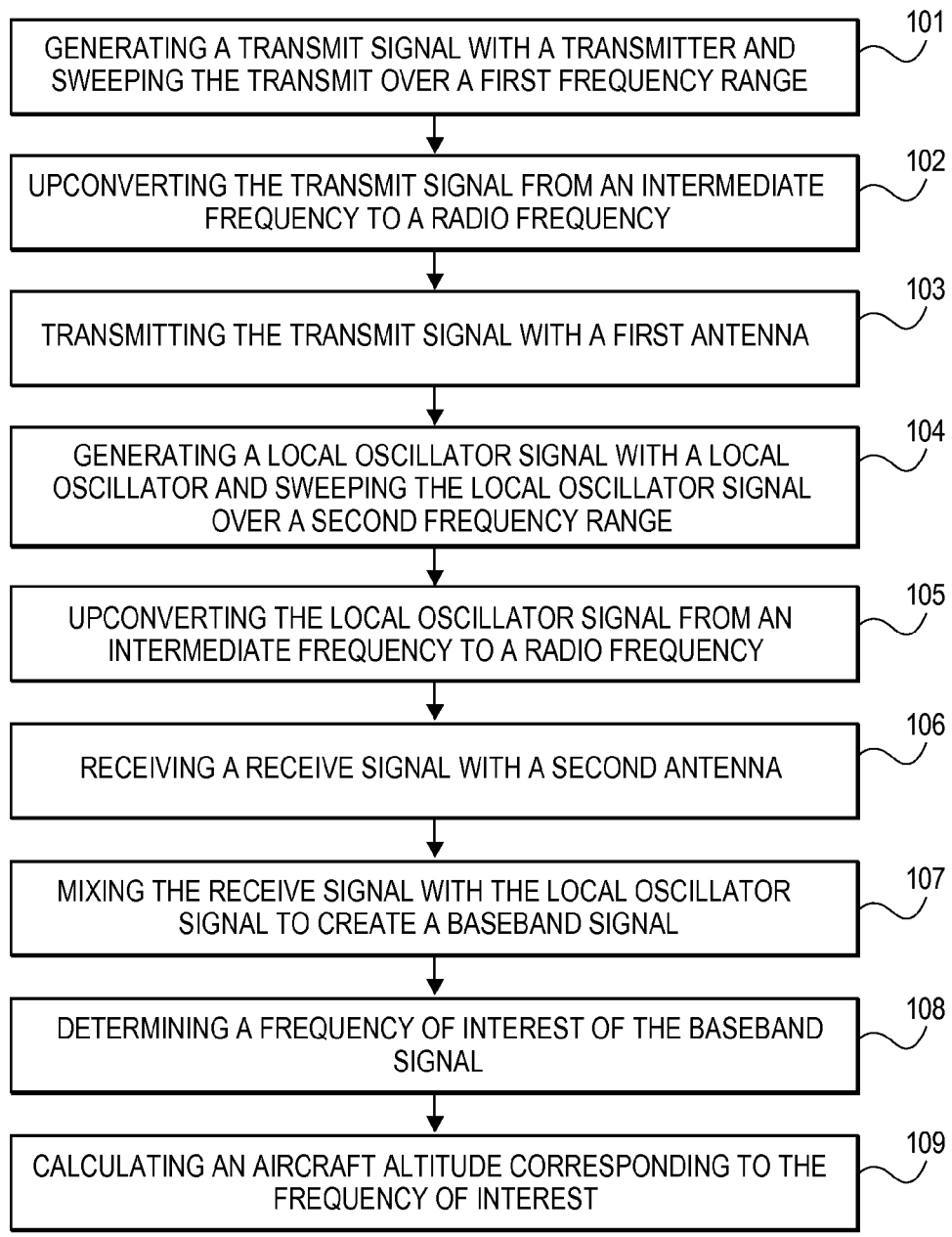
FIG. 7 is a flow diagram of at least a portion of the steps of a method for determining a height above ground of an aircraft.

FIG. 7 shows at least a portion of the steps of a method 100 in accordance with various embodiments of the present technology for determining a height above ground of an aircraft. The steps may be performed in the order presented in FIG. 7, or they may be performed in a different order. In addition, some of the steps may be performed simultaneously instead of sequentially. Furthermore, some steps may not be performed.

Referring to step 101, a transmit signal 40 is generated with a transmitter 42 and is swept over a first frequency range. The transmit signal 40 may be swept with an upsweep that includes increasing the frequency for a time period followed by a downsweep that includes decreasing the frequency for the time period.

Referring to step 102, the transmit signal 40 is upconverted from an intermediate frequency to a radio frequency. The upconversion may be performed by a first upconverter 14.

Referring to step 103, the transmit signal 40 is transmitted with a transmit antenna 20. Before transmission, the transmit signal 40 may be amplified and filtered.

Referring to step 104, a local oscillator signal 54 is generated with a local oscillator 56 and is swept over a second frequency range. The local oscillator signal 54 may be swept with the upsweep and the downsweep.

Referring to step 105, the local oscillator signal 54 is upconverted from an intermediate frequency to a radio frequency. The upconversion may be performed by a second upconverter 18. The local oscillator signal 54 may also be amplified and filtered.

Referring to step 106, a receive signal 68 is received with a receive antenna 22. The receive signal 68 may also be amplified and filtered.

Referring to step 107, the receive signal 68 is mixed with the local oscillator signal 54 to create a baseband signal 76. The frequency of the baseband signal 76 may include a difference of the frequency of the local oscillator signal 54 and the frequency of the receive signal 68. The baseband signal 76 may also be amplified, filtered, and converted from an analog form to a digital form.

Referring to step 108, a frequency of interest of the baseband signal 76 is determined. A controller 34 may sample the digital form of the baseband signal 76 and may perform a first and a second fast Fourier transform (FFT) on the sampled data followed by applying a Goertzel algorithm to determine the frequency of interest.

Referring to step 109, an aircraft altitude is calculated that corresponds to the frequency of interest. The frequency of interest of the baseband signal 76 may be used to calculate the time of flight for the transmit signal 40 to be transmitted and the receive signal 68, which is the reflection from the ground of the transmit signal 40, to be received. The time of flight may be used, in turn, to calculate the altitude of the aircraft.

A first determination of the frequency of interest of the baseband signal 76 and a first calculation of the aircraft altitude may be performed when the transmit signal 40 and the local oscillator signal 54 are generated during an upsweep. A second determination of the frequency of interest of the baseband signal 76 and a second calculation of the aircraft altitude may be performed when the transmit signal 40 and the local oscillator signal 54 are generated during a downsweep. The first calculation and the second calculation may be averaged to determine the height above ground of the aircraft.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A method for determining a height above ground of an aircraft, the method comprising the steps of:
    generating, using a local oscillator linear sweep generator, a local oscillator signal that is swept over a frequency range;
    generating, using a transmitter linear sweep generator, a transmit signal with a transmitter that is swept over the frequency range and delayed in time with respect to the local oscillator signal;
    transmitting the transmit signal with a first antenna;
    receiving a receive signal with a second antenna;
    mixing, using a mixer, the receive signal with the local oscillator signal to generate a baseband signal having a frequency of interest for calculating an aircraft altitude;
    adjusting, using a controller, the delay in time while the aircraft is on the ground until the frequency of interest is at least equal to a minimum difference frequency; and
    calculating, using the controller, the aircraft altitude based on the frequency of interest determined from the receive signal and the local oscillator signal.

2. The method of claim 1, wherein generating the transmit signal and the local oscillator signal includes an upsweep of increasing the frequency of the signals for a time period followed by a downsweep of decreasing the frequency of the signals for the time period.

3. The method of claim 2, wherein a first determination of the frequency of interest of the baseband signal and a first aircraft altitude calculation are made when the transmit signal and the local oscillator signal are generated during an upsweep and a second determination of the frequency of interest of the baseband signal and a second aircraft altitude calculation are made when the transmit signal and the local oscillator signal are generated during a downsweep.

4. The method of claim 3, wherein the height above ground of the aircraft is determined as the average of the first aircraft altitude calculation and the second aircraft altitude calculation.

5. The method of claim 1, further comprising the steps of:
upconverting the local oscillator signal from an intermediate frequency to a radio frequency, and
upconverting the transmit signal from an intermediate frequency to a radio frequency.

6. The method of claim 1, wherein the frequency of interest of the baseband signal includes a difference of the frequency of the local oscillator signal and the frequency of the receive signal.

7. The method of claim 1, wherein the transmitter linear sweep generator is a first direct digital synthesizer, and the local oscillator linear sweep generator is a second direct digital synthesizer.

8. A method for determining a height above ground of an aircraft, the method comprising the steps of:
generating a transmit signal with a transmitter linear sweep generator;
sweeping, using a controller, the transmit signal over a first frequency range including a first minimum frequency and a first maximum frequency;
transmitting the transmit signal with a first antenna;
generating a local oscillator signal with a local oscillator linear sweep generator;
sweeping, using the controller, the local oscillator signal over a second frequency range including a second minimum frequency approximately equal to the first minimum frequency minus a frequency difference and a second maximum frequency approximately equal to the first maximum frequency plus the frequency difference;
receiving a receive signal with a second antenna;
mixing, using a mixer, the receive signal with the local oscillator signal to generate a baseband signal having a frequency of interest;
shifting, using the controller, the local oscillator signal with respect to the transmit signal while the aircraft is on the ground until a frequency offset between the local oscillator signal and the transmit signal is at least equal to a minimum difference frequency; and
calculating, using the controller, the aircraft altitude based on the frequency of interest determined from the receive signal and the local oscillator signal.

9. The method of claim 8, wherein sweeping the transmit signal and the local oscillator signal includes an upsweep of increasing the frequency of the signals for a time period followed by a downsweep of decreasing the frequency of the signals for the time period.

10. The method of claim 9, wherein
a first determination of the frequency of interest of the baseband signal and a first aircraft altitude calculation are made when the transmit signal and the local oscillator signal are generated during an upsweep,
a second determination of the frequency of interest of the baseband signal and a second aircraft altitude calculation are made when the transmit signal and the local oscillator signal are generated during a downsweep, and
the height above ground of the aircraft is determined as the average of the first aircraft altitude calculation and the second aircraft altitude calculation.

11. The method of claim 8, further comprising the steps of:
upconverting the local oscillator signal from an intermediate frequency to a radio frequency, and
upconverting the transmit signal from an intermediate frequency to a radio frequency.

12. The method of claim 8, wherein the frequency of interest of the baseband signal includes a difference of the frequency of the local oscillator signal and the frequency of the receive signal.

13. The method of claim 8, wherein the transmitter linear sweep generator is a first direct digital synthesizer, and the local oscillator linear sweep generator is a second direct digital synthesizer.

14. A method for determining a height above ground of an aircraft, the method comprising the steps of:
generating a transmit signal with a transmitter linear sweep generator;
sweeping the transmit signal over a frequency range including an upsweep of increasing the frequency of the transmit signal for a time period followed by a downsweep of decreasing the frequency of the transmit signal for the time period;
upconverting the transmit signal from an intermediate frequency to a radio frequency;
transmitting the transmit signal with a first antenna;
generating a local oscillator signal with a local oscillator linear sweep generator;
sweeping the local oscillator signal over the frequency range including the upsweep of the local oscillator signal followed by the downsweep of the local oscillator signal;
upconverting the local oscillator signal from an intermediate frequency to a radio frequency;
receiving a receive signal with a second antenna;
mixing, using a mixer, the receive signal with the local oscillator signal to generate a baseband signal having a frequency of interest;
delaying, using a controller, generation of the transmit signal with respect to the local oscillator signal while the aircraft is on the ground until the frequency of interest is at least equal to a minimum difference frequency; and
calculating, using the controller, the aircraft altitude based on the frequency of interest determined from the receive signal and the local oscillator signal.

15. The method of claim 14, wherein
a first determination of the frequency of interest of the baseband signal and a first aircraft altitude calculation are made when the transmit signal and the local oscillator signal are generated during an upsweep,
a second determination of the frequency of interest of the baseband signal and a second aircraft altitude calculation are made when the transmit signal and the local oscillator signal are generated during a downsweep, and
the height above ground of the aircraft is determined as the average of the first aircraft altitude calculation and the second aircraft altitude calculation.

16. The method of claim 14, wherein the delayed generation of the transmit signal results in the local oscillator signal being swept over the frequency range before the transmit signal.

17. The method of claim 14, wherein the frequency range is from 4.25 GHz to 4.35 GHz.

18. The method of claim 14, wherein the frequency of interest of the baseband signal includes a difference of the frequency of the local oscillator signal and the frequency of the receive signal.

19. The method of claim 14, wherein the transmitter linear sweep generator is a first direct digital synthesizer, and the local oscillator linear sweep generator is a second direct digital synthesizer.

20. A method for determining a height above ground of an aircraft, the method comprising the steps of:
- generating a transmit signal with a transmitter linear sweep generator;
- sweeping the transmit signal over a first frequency range including an upsweep of increasing the frequency of the transmit signal for a time period followed by a downsweep of decreasing the frequency of the transmit signal for the time period;
- upconverting the transmit signal from an intermediate frequency to a radio frequency;
- transmitting the transmit signal with a first antenna;
- generating a local oscillator signal with a local oscillator linear sweep generator;
- sweeping the local oscillator signal over a second frequency range including the upsweep of the local oscillator signal followed by the downsweep of the local oscillator signal;
- upconverting the local oscillator signal from an intermediate frequency to a radio frequency;
- receiving a receive signal with a second antenna;
- mixing, using a mixer, the receive signal with the local oscillator signal to generate a baseband signal having a frequency of interest;
- shifting, using a controller, the local oscillator signal with respect to the transmit signal while the aircraft is on the ground until a frequency offset between the local oscillator signal and the transmit signal is at least equal to a minimum difference frequency; and
- calculating, using the controller, an aircraft altitude based on the frequency of interest determined from the receive signal and the local oscillator signal;
- wherein the first frequency range includes a first minimum frequency and a first maximum frequency and the second frequency range includes a second minimum frequency approximately equal to the first minimum frequency minus a frequency difference and a second maximum frequency approximately equal to the first maximum frequency plus the frequency difference.

21. The method of claim 8, wherein the frequency of interest is equal to the frequency offset while the aircraft is on the ground.

22. The method of claim 20, wherein the frequency of interest is equal to the frequency offset while the aircraft is on the ground.

23. The method of claim 8, wherein the frequency offset between the transmit signal and the local oscillator signal remains substantially constant as the transmit signal is swept over the first frequency range and the local oscillator signal is swept over the second frequency range.

24. The method of claim 20, wherein the frequency offset between the transmit signal and the local oscillator signal remains substantially constant as the transmit signal is swept over the first frequency range and the local oscillator signal is swept over the second frequency range.

25. The method of claim 21, wherein the frequency offset is equal to the frequency difference.

26. The method of claim 22, wherein the frequency offset is equal to the frequency difference.

27. The method of claim 21, wherein the frequency of the local oscillator signal is greater than the frequency of the transmit signal.

28. The method of claim 22, wherein the frequency of the local oscillator signal is greater than the frequency of the transmit signal.

29. The method of claim 9, further comprising the step of shifting the local oscillator signal from the second maximum frequency to a frequency less than the first maximum frequency of the transmit signal when the upsweep is complete.

30. The method of claim 20, further comprising the step of shifting the local oscillator signal from the second maximum frequency to a frequency less than the first maximum frequency of the transmit signal when the upsweep is complete.

31. The method of claim 29, wherein the frequency of the transmit signal does not change when the local oscillator signal is shifted from the second maximum frequency.

32. The method of claim 30, wherein the frequency of the transmit signal does not change when the local oscillator signal is shifted from the second maximum frequency.

33. The method of claim 20, wherein the first frequency range is from 4.25 GHz to 4.35 GHz.

34. The method of claim 1, wherein the minimum difference frequency is 20 kHz.

35. The method of claim 8, wherein the minimum difference frequency is 20 kHz.

36. The method of claim 14, wherein the minimum difference frequency is 20 kHz.

37. The method of claim 20, wherein the minimum difference frequency is 20 kHz.

* * * * *